March 28, 1950 D. H. EWING 2,502,317
RADIO NAVIGATION
Filed Sept. 30, 1947 2 Sheets-Sheet 1
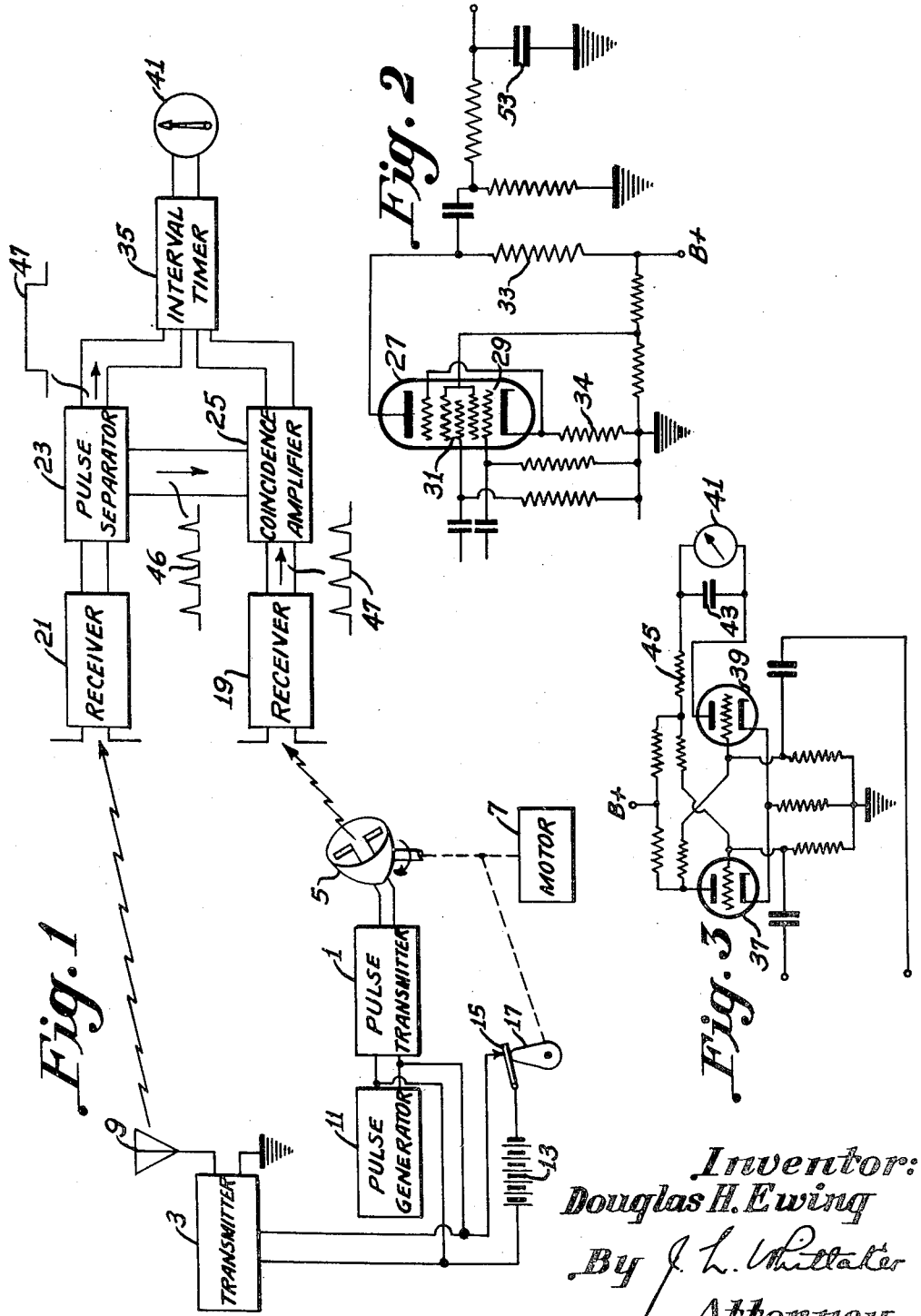
Inventor:
Douglas H. Ewing
By J. L. Whittaker
Attorney March 28, 1950 D. H. EWING 2,502,317
RADIO NAVIGATION
Filed Sept. 30, 1947 2 Sheets-Sheet 2
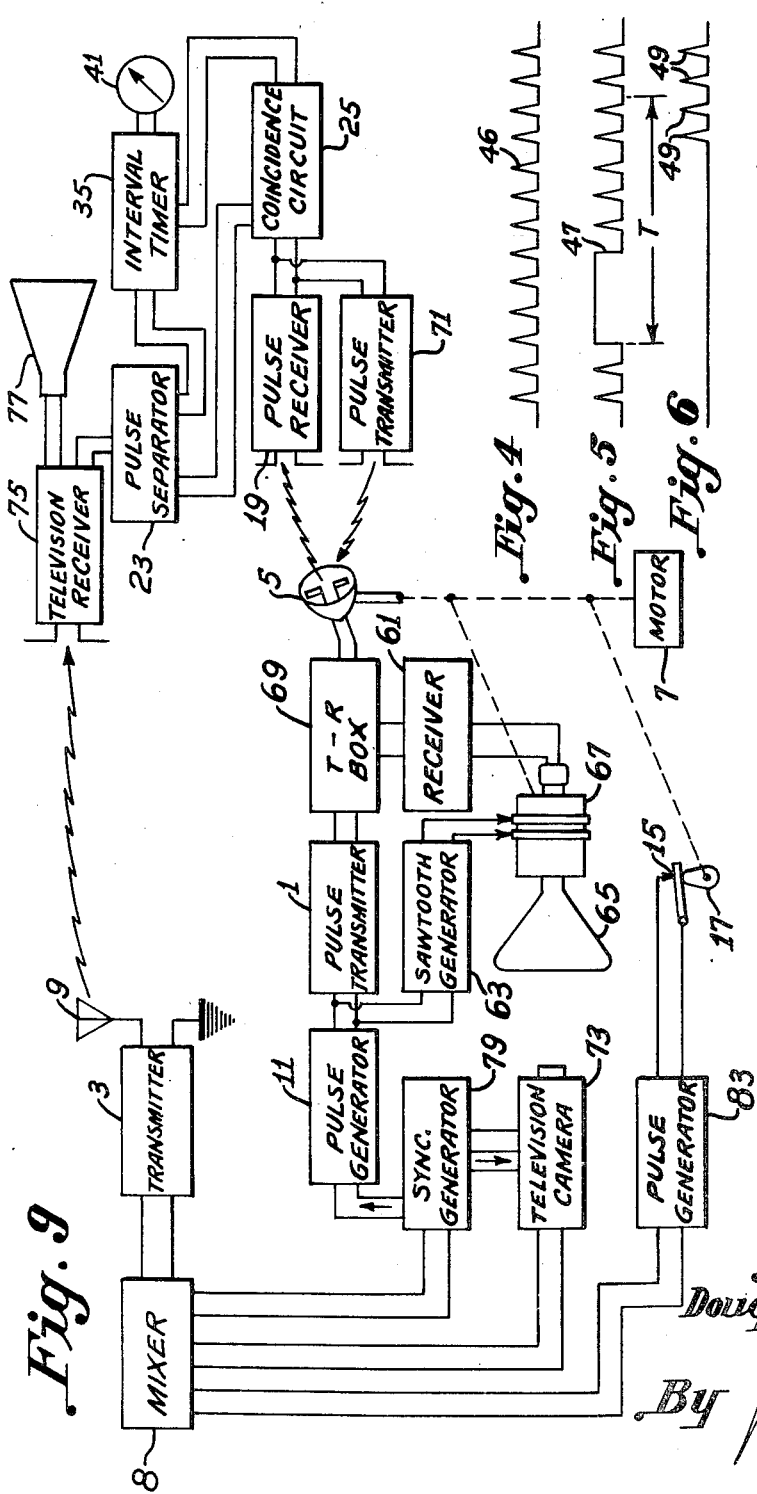
Inventor:
Douglas H. Ewing
By J. L. Whittaker
Attorney Patented Mar. 28, 1950

2,502,317

UNITED STATES PATENT OFFICE 2,502,317

RADIO NAVIGATION

Douglas H. Ewing, Westmont, N. J., assignor to Radio Corporation of America, a corporation of Delaware Application September 30, 1947, Serial No. 776,923

4 Claims. (Cl. 343—6)

1

This invention relates to radio navigation, and more particularly to improvements in omnidirectional radio ranges.

It is the principal object of this invention to provide omidirectional radio ranges which transmit pulse modulated signals, and are adapted to be used in combination with certain types of pulse echo radar apparatus, certain elements being used both for the radar and omidirectional range functions.

Another object of the invention is to provide a method of and means for preventing or minimizing interference between different radio ranges or interference of undesired signals with a pulsed radio range.

A further object of this invention is to provide an omnidirectional radio range in combination with a navigation system of the type described in U. S. Patent application Serial No. 607,999½ entitled Radio Navigation System and filed September 27, 1945 by L. F. Jones, wherein positional information obtained by radar means at a ground station is relayed to aircraft by television.

The invention will be described with reference to the accompanying drawings, wherein:

Figure 1 is a schematic diagram of a pulse modulated omnidirectional radio range system embodying the present invention, Figure 2 is a circuit diagram of a pulse coincidence device suitable for use in the system of Fig. 1, Figure 3 is a diagram of a pulse interval timer, Figures 4, 5, 6, 7 and 8 are oscillograms illustrating signals produced at various points in the system of Fig. 1 during its operation, and Figure 9 is a schematic diagram of a radar and television relay navigation system embodying the instant invention.

Similar reference characters are applied to similar elements throughout the drawings.

Referring to Fig. 1, the range transmitter system is located at a ground station and comprises two transmitters 1 and 3. The transmitter 1 is provided with a sharply directive antenna 5 which is rotated continuously in azimuth by a motor 7. The antenna 9 of the transmitter 3 is non-directive, i. e. radiates substantially equally in all directions. A pulse generator 11 modulates both transmitters 1 and 3.

A second modulation source, which for the purpose of illustration may comprise a battery 13 and a switch 15, is connected to the transmitter

2

3. The switch 15 is operated periodically by a cam 17 driven by the motor 7. The cam 17 is designed to close the switch 15 only during a brief interval while the antenna 5 points in some reference direction such as north.

The range receiver system, which is intended to be carried aboard all mobile craft using the range, includes receivers 19 and 21 designed to respond to the transmitters 1 and 3 respectively. The output of the receiver 21 is applied to a pulse separator circuit 23. This circuit includes any known means, such as integrating and differentiating circuits, for diverting the pulses from the pulse generator 11 into one output channel and passing the reference signals produced by the switch 15 into another output channel.

The pulses derived from the pulse generator 11 and appearing at the separator circuit 23 are applied to a coincidence circuit 25. The output of the receiver 19 is also applied to the coincidence circuit 25. Referring to Fig. 2, the concidence circuit may comprise a tube 27 having multiple control grids, for example a tube of the type known in the radio art as a 6L7. The inner control grid 29 is supplied with one signal, for instance the output of the receiver 19. The second control grid 31 is coupled to the output of the pulse separator 23. The anode circuit includes a load resistor 33, and is coupled through a blocking condenser to a pulse interval timer circuit 35 (Fig. 1). A self-bias resistor 34 in the cathode circuit holds the tube 27 approximately at cutoff condition. A positive pulse applied to either control grid alone is insufficient to cause any significant increase of plate current. When positive pulses are applied to both grids simultaneously, the tube 27 conducts, producing a negative-going output pulse.

Referring to Fig. 3, the pulse interval timer 35 comprises a pair of tubes 37 and 39 connected in a so called "trigger" circuit of the Eccles-Jordan type. The circuit has two stable conditions, one with the tube 37 conducting and the tube 39 cut off, and the other with the tube 39 conducting and the tube 37 cut off. The circuit may be thrown from one state to the other by application of a negative pulse of sufficient magnitude to the grid of tube which is conducting at the movement, or by applying a positive pulse to the grid of the other tube. A current meter 41 is included in the anode circuit of the tube 39. A capacitor 43 is connected across the meter to integrate the flow of current through it so as to provide indication of average rather than instantaneous current. A series resistor 45 may be provided to accentuate this effect.

The control grid of the tube 39 is coupled to the pulse separator 23 so as to start conduction through the meter 41, and is connected also to the coincidence amplifier 25. Each pulse from the pulse separator starts conduction through the tube 39, and the next ensuing negative pulse from the coincidence circuit stops conduction through the tube 39. If the on-off cycle is repeated with a period which is of the same order as the time constant of the integrating circuit formed by the capacitor 43, the inertia of the meter 41, and the resistor 45, the meter will indicate the intervals between the "start" pulses from the separator 23 and the corresponding "stop" pulses from the coincidence circuit 25.

The system of Fig. 1 operates as follows:

The pulse generator 11 produces a continuous train of brief voltage pulses, shown in the oscillogram of Fig. 4. The pulses may be repeated at intervals of for example, one thousandth second. The transmitter 1, being modulated by the generator 11, produces a corresponding train of pulses of radio frequency energy, which are radiated directly by the antenna 5. The transmitter 3 is likewise modulated and its pulsed radio frequency output is radiated in all horizontal directions by the antenna 9.

The antenna 5 rotates several times per minute, preferably at the highest rate consistent with mechanical considerations. Each time its beam points in the reference direction (north) the switch 15 closes momentarily, applying voltage from the source 13 to the transmitter 3 for a period several times as long as the pulse duration time of the pulses from the generator 11. Fig. 5 shows the modulation of the transmitter 3 when the beam of the antenna 5 passes through north; the wide pulse 47 is caused by closure of the switch 15.

At the mobile station, the output of the receiver 21 corresponds to the oscillogram of Fig. 5. It is to be understood that Fig. 5 shows only a small portion of the modulation cycle, corresponding to the period when the beam of the antenna 5 is in the neighborhood of north. During the remainder of the antenna rotation cycle, the output of the receiver 21 comprises the continuous train of short pulses originating at the generator 11. The pulse separator 23 applies the short pulses to the coincidence circuit 25 and the long pulses to the interval timer 35.

The receiver 19 provides no output, except what may result from undesired signals or noise, during the major portion of the rotation period of the antenna 5. When the antenna 5 bears on the mobile station, a number of pulses appear at the receiver 19 as the beam sweeps past. Fig. 6 represents the output of the receiver 19 when the mobile craft is a few degrees eastward of north from the ground station. The time T between the pulse 47 (Fig. 5) and the middle of the group of pulses 49 in Fig. 6 is a measure of the bearing of the mobile station.

Each long pulse 47 starts the interval timer 35. To stop the timer, coincident pulses must reach the circuit 25, producing the required negative output pulse. Referring to Fig. 7, the output of the coincidence circuit is zero, notwithstanding the presence of the short pulses 46 from the separator 23, until the pulses 49 appear. At this time the coincidence circuit produces a train of negative pulses 51. These may be integrated by a suitable resistor-capacitor combination 59 (see Fig. 2) to provide a single wide pulse 53, shown by the dash line in Fig. 7. The wide pulse 53 stops the timer 35.

Random narrow pulses, such as would occur when a pulse 46 happened to coincide with an interfering pulse coming for example from another ground station, will be dissipated in the integrating network 53 and have no effect on the timer 35. As shown in Fig. 8, the timer is "on" during the period T. The average current throughout an entire antenna rotation period is proportional to the bearing angle of the mobile station from the ground station, and is thus indicated by the meter 41.

Attention is drawn to the fact that an interfering signal, even a pulse train having the same repetition period as the pulses from the generator 11 cannot produce false bearing indications unless its individual pulses as received at the mobile station are in coincidence with the individual pulses received from the ground station. Such coincidence is extremely unlikely, particularly over the relatively extended period required for an alteration in the bearing indication to take place. Pulses from other similar ground stations will, if of high enough amplitude, cause the apparatus to indicate the bearing of the ground station from which the greatest signal is received.

It is virtually impossible for the timer to be started by pulses from one ground station and stopped by pulses from another, because the two pulse trains would not be in coincidence at the mobile station, owing to different distances and hence radiation travel time delays from the ground stations to the mobile station. To make doubly certain, the various ground stations may use slightly different pulse repetition rates.

The functions of some of the elements of the system of Fig. 1 may be performed by similar elements in a radar and television relay navigation system like that of the aforementioned Jones application Serial No. 607,999½. The combination of the two systems has the advantage of providing more navigational information than either one alone without requiring a corresponding amount of additional equipment.

Referring to Fig. 9, wherein elements corresponding to those in Fig. 1 are designated by corresponding reference numerals the transmitter 1, antenna 5, motor 7 and pulse generator 11 form part of a pulse echo radar system. The radar set includes in addition a receiver 61, a saw-tooth wave generator 63, and a cathode ray oscilloscope tube 65. The tube 65 is provided with a deflection yoke 67 which is rotated in synchronism with the antenna 5 and is energized by the saw-tooth wave generator 63. The generator 63 is controlled by the pulse generator 11 to initiate a radial trace of the cathode ray beam in the tube 65 in response to each pulse. A T-R box or antenna duplexing device 69 is provided in the connections between the transmitter 1, receiver 61 and the antenna 5 to protect the receiver from the output of the transmitter.

The radar set operates by sending out a beam of pulse modulated energy which is reflected from (or may be re-transmitted by) any mobile craft within the service area. The reflected or re-transmitted signals received by the receiver 61 control the intensity of the cathode ray beam of the tube 65, producing a bright spot or "pip" on the screen in response to each reflection. The distance of the spot radially from the center of the screen is proportional to the time required for the transmitted signal to travel to the craft and back to the ground station, and thus is a measure of distance.

The radial line of deflection rotates with the antenna 5, providing on the screen of the tube 65 a map-like display showing the positions of all craft in the service area. This type indication is commonly known as PPI, or plan position indication.

To facilitate discrimination between echo signals returned by mobile craft and those caused by reflections from the surrounding terrain, each craft may carry a "responder beacon," comprising receiver 19 and a pulse transmitter 71. Signals received from the ground station are amplified and reradiated by the transmitter 71 with a much higher amplitude than those which are merely reflected. Preferably the transponder transmits on a somewhat different carrier frequency than the transmitter 1, and the receiver 61 is tuned to this frequency.

The PPI information may be relayed to the aircraft by the television system including a camera 73 coupled to the transmitter 3 and a television receiver 75 carried aboard the craft and connected to a cathode ray tube 77. The usual television synchronizing signals are generated by a sync generator 79 and transmitted by the transmitter 3 along with the video signals from the camera 73. The pulse generator 11 is controlled by the sync generator 79 so that each pulse coincides in timing with a line synchronizing pulse from the generator 79. As in the system of Fig. 1 the switch 15 closes when the antenna 5 points north to provide a characteristic reference modulation which is applied to a mixer 81 for interposing it into the composite television signal for its transmission therewith. The reference modulation may be supplied as in Fig. 1 by a D.-C. source, or by a pulse generator 83 which provides a characteristic pulse or group of pulses upon closure of the switch 15.

At the mobile station, the pulse separator 23 deflects the reference pulses to the interval timer 35 and applies pulses corresponding to the television line synchronizing pulses to the coincidence circuit 25. The oscilloscope tube 77 reproduces the visual display appearing at the ground station on the tube 65 showing the pilot or navigator of the craft the relative positions of all aircraft including his own in the vicinity of the ground station. The reference pulses derived from the pulse generator 83 start the interval timer 35 each time the antenna 5 points north. The coincidence circuit 25 operates in response to coincidence of received radar pulses with television line synchronizing pulses to stop the timer 35 when the antenna 5 bears on the mobile craft. The radar pulses need not occur at the same repetition frequency as the line synchronizing pulses, as long as each radar pulse is coincident with a line synchronizing pulse.

It will be apparent that the aforementioned advantages of the system of Fig. 1 are also present in that of Fig. 9. Moreover, the bearing indication on the meter 41 is always with reference to the ground station whose location appears at the deflection center of the PPI pattern on the face of the tube 77. This enables the operator to determine which pip on the PPI display corresponds to his own craft.

I claim as my invention:

1. An omnidirectional radio range system including at least one ground station comprising means transmitting a pulse modulated signal in a narrow beam and rotating said beam continuously in azimuth, means transmitting in all directions simultaneously from said ground station a signal which is modulated by pulses in time coincidence with those on said first signal, and means impressing a different characteristic modulation on said second signal only when the azimuth of transmission of said first signal is in a reference direction such as north; at least one mobile station comprising means reproducing separately the modulations on said transmitted signals as received at said mobile station, means responsive only to simultaneous presence of both of said pulse modulations with their respective pulses in time coincidence to produce a control voltage, and means for measuring the time interval between said different characteristic modulations and said control voltage.

2. In a radio navigation system including at a ground station pulse modulated radar apparatus scanning in azimuth a service area to provide a map-like visual display showing the positions of mobile craft in said area, television transmitter means at said ground station, said television transmitter means including means providing conventional synchronizing signals, and means controlling said radar apparatus to transmit pulses only in coincidence with said synchronizing signals, means providing a time reference signal only when said radar apparatus transmits in a given direction, such as north, and means superimposing said time reference signal on said television signal, television receiver means on said craft for reproducing said visual display and said synchronizing and reference signals on said craft, further receiver means on said craft reproducing those of the pulses transmitted from said radar apparatus which reach said craft; means responsive only to simultaneous presence of said received radar pulses and said synchronizing signals in time coincidence to produce a control voltage, and means for measuring the time interval between said reference signal and said control voltage.

3. In an omnidirectional radio range system including a ground station comprising means transmitting a pulse modulated signal in a narrow beam and rotating said beam continuously in azimuth, means transmitting in all directions simultaneously from said ground station a signal which is modulated by pulses in time coincidence with those on said first signal and means impressing a different characteristic modulation on said second signal only when the azimuth of transmission of said first signal is in a reference direction such as north, a mobile station comprising means reproducing separately the modulations on said transmitted signals as received at said mobile station; means responsive only to simultaneous presence of both of said pulse modulations with their respective pulses in time coincidence to produce a control voltage, and an azimuth indicating device including an indicator and a means for measuring the time interval between said different characteristic modulation and said control voltage to actuate the indicator in accordance therewith.

4. In a radio navigation system, a ground station including pulse modulated radar apparatus scanning in azimuth a service area to provide a map-like visual display showing the positions of mobile craft in said area, television transmitter means at said ground station, said television transmitter means including means providing conventional synchronizing signals, and means controlling said radar apparatus to transmit pulses only in coincidence with said synchronizing signals, means providing a time reference signal only when said radar apparatus transmits in a given direction, such as north, and means interposing said time reference signal into said television signal.

DOUGLAS H. EWING.

REFERENCES CITED

The following references are of record in the file of this patent:

UNITED STATES PATENTS

| Number | Name | Date |
|---|---|---|
| 1,135,604 | Meissner | Apr. 13, 1915 |
| 2,027,530 | Hammond | Jan. 14, 1936 |
| 2,252,083 | Luck | Aug. 12, 1941 |
| 2,421,017 | Deloraine | May 27, 1947 |

FOREIGN PATENTS

| Number | Country | Date |
|---|---|---|
| 189,266 | Great Britain | Nov. 30, 1922 |